US011860583B2

(12) United States Patent
Martel

(10) Patent No.: US 11,860,583 B2
(45) Date of Patent: Jan. 2, 2024

(54) ACTUATING MECHANISM FOR A TIMEPIECE MOVEMENT, IN PARTICULAR CHRONOGRAPH MECHANISM COMPRISING SUCH AN ACTUATING MECHANISM

(71) Applicant: MANUFACTURE D'HORLOGERIE AUDEMARS PIGUET SA, Le Brassus (CH)

(72) Inventor: Julien Martel, La Chaux-de-Fonds (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 125 days.

(21) Appl. No.: 17/697,473

(22) Filed: Mar. 17, 2022

(65) Prior Publication Data

US 2022/0299945 A1 Sep. 22, 2022

(30) Foreign Application Priority Data

Mar. 18, 2021 (CH) ........................................ 288/21

(51) Int. Cl.
*G04F 7/10* (2006.01)
*G04F 7/08* (2006.01)

(52) U.S. Cl.
CPC .............. *G04F 7/10* (2013.01); *G04F 7/0804* (2013.01); *G04F 7/0809* (2013.01); *G04F 7/0847* (2013.01)

(58) Field of Classification Search
CPC ........ G04F 7/10; G04F 7/0804; G04F 7/0809; G04F 7/0847
See application file for complete search history.

(56) References Cited

U.S. PATENT DOCUMENTS 6,428,201 B1 * 8/2002 Shibuya ................. G04B 35/00 368/106
7,331,706 B2 * 2/2008 Gabathuler ........... G04F 7/0809 368/106

(Continued)

FOREIGN PATENT DOCUMENTS

EP 2 073 079 6/2009
JP S49 35073 4/1974

OTHER PUBLICATIONS

Anonymous, "The flyback chronograph," https://www.horlogerie-suisse.com/technique/lescomplications/chronographe-a-2-poussoirs, 7 pages.

(Continued)

*Primary Examiner* — Edwin A. Leon
*Assistant Examiner* — Sean R Brannon
(74) *Attorney, Agent, or Firm* — NIXON & VANDERHYE

(57) ABSTRACT

An "all or nothing" actuating mechanism for a timepiece movement is described, which includes: an actuating lever that is able to move between an inactive position and an active position; a movable control lever for moving the actuating lever between its inactive and active positions; a return member for returning the control lever to its initial position; and a control member capable of pivoting between a first state in which it locks the actuating lever in its inactive position, and a second state, in which it releases the actuating lever to allow it to move to its active position. The control lever is arranged to be able to act on the control member, and move it from its first state to its second state, the actuating mechanism including a jumper tending to return the control member to its first state.

30 Claims, 11 Drawing Sheets

1

(56) References Cited

U.S. PATENT DOCUMENTS

| | | | | |
|---|---|---|---|---|
| 7,422,364 | B2 * | 9/2008 | Scheufele | G04F 7/0809<br>368/106 |
| 9,164,492 | B2 * | 10/2015 | Philippine | G04F 7/0819 |
| 11,687,043 | B2 * | 6/2023 | Rochat | G04F 7/0814<br>368/106 |

OTHER PUBLICATIONS

Anonymous, "Chronograph with 2 pushers," https://www.horlogerie-suisse.com/technique/les-complications/le-chronographe-flyback, 7 pages.

Search Report for CH2882021, dated Jul. 9, 2021, 3 pages.

* cited by examiner

ACTUATING MECHANISM FOR A TIMEPIECE MOVEMENT, IN PARTICULAR CHRONOGRAPH MECHANISM COMPRISING SUCH AN ACTUATING MECHANISM

This application claims priority to CH 00288/21 filed Mar. 18, 2021, the entire contents of which is hereby incorporated by reference.

TECHNICAL FIELD

The present invention relates to an "all-or-nothing" actuating mechanism for a timepiece movement comprising

- an actuating lever for actuating a clock function intended to be mounted so as to be able to move on a frame element of the timepiece movement, between an inactive position and an active position,
- a control lever intended to be moved in response to pressure applied by a user, between an initial position and an actuated position, so as to be able to move the actuating lever from its inactive position to its active position,
- an elastic return member arranged to return the control lever to its initial position in response to it being released by the user,
- a control member capable of pivoting between a first inactive state, in which it locks the actuating lever in its inactive position, and a second state, in which it releases the actuating lever to allow it to move to its active position under the effect of the action of the control lever,
- the control lever being arranged to act on the control member, in response to pressure applied by the user, and move it from its first state to its second state.

According to a preferred embodiment, the invention relates to a chronograph mechanism with flyback function comprising such an actuating mechanism.

The present invention also relates to a timepiece movement provided with such a mechanism and a timepiece comprising such a timepiece movement.

PRIOR ART

Timepiece mechanisms of this type are already known in the prior art, in particular in connection with chronograph mechanisms.

For example, the website https://www.horlogerie-suisse-.com/technique/les-complications/chronographe-a-2-poussoirs illustrates and describes a chronograph mechanism comprising a zero-reset device that has the above features. More specifically, this chronograph mechanism comprises a first control lever intended to be pressed by a user in order to pivot a column-wheel, the columns of which control the positions of several levers. More specifically, a coupling lever is controlled by the column-wheel to alternately occupy an uncoupled position, when no time measurement is taking place, and a coupled position in which a chronograph counter is rotated. The column-wheel also controls the position of zero-reset hammers. When time measurement is started, the column-wheel raises the zero-reset hammers until a pin secured to the latter engages in a notch provided in a pivoting control member. The mechanism comprises a second, zero-reset, control lever, intended to release the zero-reset hammers in response to pressure being applied by the user. When this second control lever is pressed, it acts on the control member to make it pivot to the end of its travel where the notch of the control member reaches a position in which it suddenly releases the pin of the zero-reset hammers which can then fall onto zero-reset cams, under the effect of the action of a specific spring. It should be noted that, in such a mechanism, the column-wheel can occupy three successive angular orientations corresponding to the START, STOP and RESET states of the chronograph mechanism. In its START state, the column which has raised the zero-reset hammers remains in position and the zero-reset therefore cannot be activated when time measurement is underway. The first control lever then needs to be pressed in order to pivot the column-wheel to its STOP state in which this column is moved away from the zero-reset hammers which could then fall onto the zero-reset cams if they were not retained in the raised position by the cooperation between their pin and the control member. Such a structure is therefore not suitable for implementing a flyback function, i.e., actuation of the zero-reset hammers while time measurement is underway. Moreover, it should also be noted that the spring returning the control member to its inactive position, once the second control lever has been released by the user, is generally strong enough to secure the zero-reset hammers in the raised position. The pressure the user needs to apply to the second control lever in order to implement a zero-reset is therefore relatively high, and indeed uncomfortable.

Moreover, the same website https://www.horlogerie-suisse.com/technique/les-complications/le-chronographe-flyback describes a chronograph mechanism structure with flyback function. In this instance, a zero-reset control lever acts on the zero-reset hammers in order to pivot them, via a lever. Although this mechanism has the merit of simplicity, it does not allow an "all-or-nothing" solution to be implemented and does not transmit any feedback to the user when he or she actuates the zero-reset control lever.

DISCLOSURE OF THE INVENTION

A main aim of the present invention is to propose an "all-or-nothing" actuating mechanism intended to actuate a mechanism of a timepiece movement, in particular suitable for implementing a flyback function in relation with a chronograph mechanism, and offering good comfort of use, in particular by providing feedback to the user when he or she actuates the mechanism of the timepiece movement with which it is associated.

To this end, the present invention relates more particularly to an "all or nothing" actuating mechanism as indicated above, characterized

- by the fact that the control lever has an elastically deformable portion, arranged to act on the actuating lever and tend to move it towards its active position in response to the pressure applied by the user, and a rigid portion arranged to act on the actuating lever and move it towards its inactive position in response to the control lever being released, and by the fact that the actuating mechanism comprises a jumper arranged to return the control member to its first state in response to the control lever being released.

As a result of these features, the structure of the mechanism according to the invention offers great freedom of design, in particular in terms of the choice of the layout of the various components involved with respect to each other. Moreover, when actuating by applying pressure to the control lever, the user must apply a force to overcome the action of three springs simultaneously: that of the control lever, that constituted by the deformable portion of the control lever intended to act on the actuating lever, and that constituted by the jumper of the control member. The elastic properties of these three springs can be adjusted with a great deal of flexibility and, in particular, chosen such that the force to be applied to each of these springs is substantially linear over the entire travel of the control lever. The user therefore feels increasing, smooth resistance when actuating the control lever, which is particularly advantageous from the point of view of comfort of use and confers an impression of high quality to the mechanism according to the invention. Naturally, in certain cases, one or more additional springs may be involved, depending on the nature of the clock function that is being controlled.

Preferably, the rigid portion of the control lever may be provided with a retractable pawl intended to cooperate with the control member.

Moreover, the control member may advantageously be a column-wheel comprising

- a disc carrying N teeth intended to cooperate with the control lever to switch from the first state to the second state, and with the jumper to switch from the second state to the first state, and
- N columns intended to cooperate with the actuating lever.

Therefore, apart from the fact that it can be installed on a frame element in a very flexible manner to take into account the shapes and dimensions of the other components of the mechanism, the column-wheel offers very reliable operating precision.

According to a preferred embodiment, the present invention relates to a chronograph mechanism with a flyback function, for a timepiece movement, comprising

- at least one chronograph counter,
- a transmission member capable of having a first, coupled, position, in which a kinematic link between a drive wheel of the timepiece movement and the chronograph counter is functional, and a second, uncoupled, position, in which the kinematic link is broken,
- a brake that is able to move between a first position, in which it acts on the chronograph counter to lock it, and at least one second position, in which it leaves the chronograph counter free to rotate,
- a control unit that can be actuated by a user to alternately occupy a first state, corresponding to time measurement, and a second state, corresponding to the chronograph mechanism being stopped, the control unit being arranged to cooperate with the transmission member and with the brake to define their respective positions,
- a zero-reset device,
- and an actuating mechanism according to the features mentioned above, in which the actuating lever performs the function of a zero-reset hammer of the zero-reset device, in relation with the chronograph counter, the actuating lever being set apart from the chronograph counter in its inactive position, and cooperating with the chronograph counter in its active position, in order to place it in a predefined configuration,
- the control member being capable of acting on the transmission member and on the brake, to shift them to their second position, in response to the pressure applied to the control lever by the user.

Therefore, the advantages of the actuating mechanism according to the invention are applied to the implementation of a flyback function, in relation with a chronograph mechanism, offering good ergonomics and a high level of user comfort.

Preferably, in this case,

- the chronograph mechanism may comprise a lever arranged to cooperate with the control member so as to occupy first and second orientations associated respectively with the first and second states of the control member, and
- the lever may also be arranged
  - to be able to switch the transmission member from its first position to its second position, and
  - to be able to switch the brake from its first position to its second position,
- by switching from its first to its second orientation.

In this case, the chronograph mechanism may advantageously comprise a coupling lever carrying the transmission member and comprising an elastically deformable portion capable of being stressed to switch the transmission member to its second position in response to pressure applied to the control lever by the user.

Generally, it may be advantageous

- to provide the chronograph mechanism with a minute counter coaxial with the chronograph counter and an additional zero-reset hammer that is able to move between an inactive position, set apart from the minute counter, and a zero-reset position in which it cooperates with the minute counter in order to place it in a predefined configuration, and
- for the additional zero-reset hammer to be secured to the actuating lever and have the same axis of rotation as the latter.

The present invention generally relates to a timepiece movement comprising an actuating mechanism and/or a chronograph mechanism that has the above features, whether the chronograph mechanism is integrated directly into the timepiece movement or combined with an existing timepiece calibre in the form of an additional module in order to define the timepiece movement according to the invention, and a timepiece comprising such a timepiece movement.

BRIEF DESCRIPTION OF THE DRAWINGS

Other features and advantages of the present invention will be more clearly understood upon reading the following detailed description of a preferred embodiment, made with reference to the accompanying drawings, which are provided as non-limiting examples only and wherein.

EMBODIMENT(S) OF THE INVENTION

The aim of the following detailed description is to describe a chronograph mechanism with flyback function comprising an "all or nothing" actuating mechanism according to a preferred embodiment of the present invention, provided as an illustrative and non-limiting example. More specifically, according to the embodiment shown and described, the chronograph mechanism may be intended to be integrated into a timepiece movement or, alternatively, may be combined with an existing timepiece calibre in the form of an additional module.

It should be noted that a person skilled in the art may implement the actuating mechanism according to the invention in relation with other types of timepiece mechanisms without departing from the context of the invention as defined in the set of claims. Therefore, it may be possible, for example, to associate the actuating mechanism according to the present invention with a striking mechanism. In this case, the actuating mechanism would be used to load a spring driving the striking mechanism and actuate the striking mechanism only when the spring is sufficiently loaded.

Figure 1:
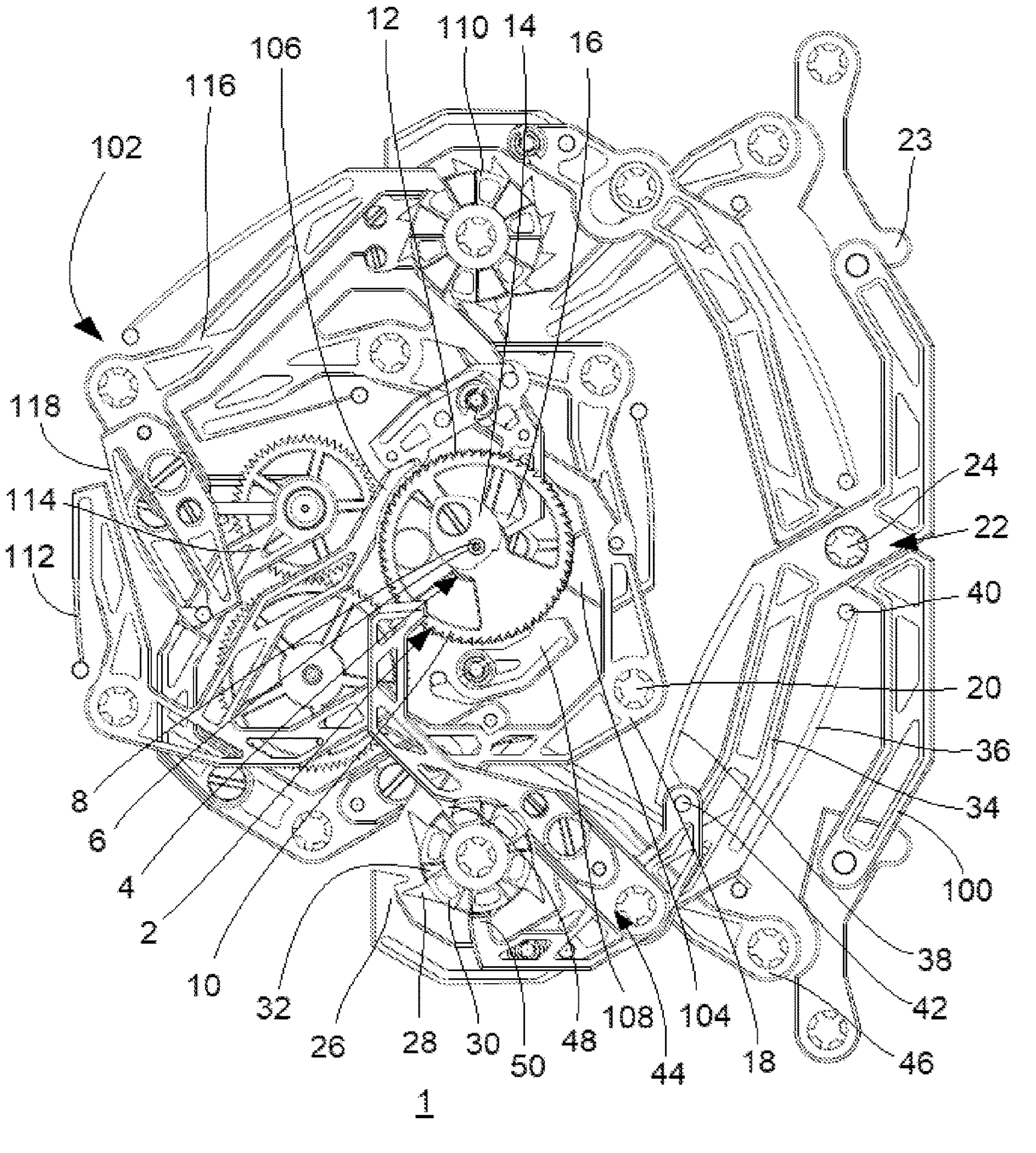
FIG. 1 shows a partial front view of a chronograph mechanism comprising an actuating mechanism according to a preferred embodiment of the present invention.

FIG. 1 shows a partial front view of a chronograph mechanism 1 having a flyback function, according to a preferred embodiment of the present invention.

Generally, the chronograph mechanism 1 may have different known structures, such as, for example, of the shuttle or column-wheel type, without particularly impacting on the operation of the actuating mechanism according to the invention. Therefore, the chronograph mechanism 1 will not be fully described in detail.

The chronograph mechanism 1 in this case comprises, as an illustrative and non-limiting example, two counters arranged coaxially: a minute counter 2 and a second counter 4. Each of the counters 2 and 4 is constituted by a wheel comprising a shaft 6, 8 (the minutes shaft 6 being hollow in order to define a passage for the seconds shaft 8), as well as a disc 10, 12 and a zero-reset cam 14, 16 secured to the corresponding shaft. Each disc 10, 12 is toothed in order to drive the corresponding counter. Each shaft 6, 8 is intended to carry a display member, for displaying the minutes and the seconds respectively.

Conventionally, the chronograph mechanism 1 is provided with a first START/STOP control lever 100 for starting and stopping the driving of the counters 2 and 4 in order to measure or stop measuring time, via at least one coupling 102.

The chronograph mechanism 1 also comprises one brake 104 arranged on a frame element so as to be able to pivot typically between two positions, a first inactive START position in which it is situated at a distance from the counter 4, and a second STOP position in which it acts on the disc 12 in order to lock the counter 4 and allow a measured time to be read. Typically, a jumper 108 can lock the minute counter. The chronograph mechanism 1 therefore comprises a conventional device arranged to act on the brake 104 and control its position depending on the current state of the chronograph mechanism (START/STOP), in this case a column-wheel 110 that also cooperates with the coupling 102.

Moreover, the chronograph mechanism 1 according to the present invention is also provided with a second zero-reset control lever 22. The second control lever 22 is secured to an actuating surface 23, at a first of its ends, the actuating surface being intended to receive pressure applied by a user to a zero-reset push button of the corresponding timepiece, so as to pivot in the anti-clockwise direction of rotation in the view shown in FIG. 1, according to the axis of rotation 24.

At its other end, the second control lever 22 carries a retractable pawl 26 intended to cooperate with a toothing 28 of a control member 30, in this case in the form of an additional column-wheel comprising as many columns 32 as the toothing 28 comprises teeth, in this case N=6, as an illustrative and non-limiting example.

The additional column-wheel is pivoted on a frame element (not shown) of the chronograph mechanism 1, or of the corresponding timepiece movement, and allows the state of different components involved in resetting the counters 2 and 4 to zero to be controlled, as described below.

The second control lever 22 comprises a central and rigid main portion 34, from which two elastic portions 36, 38 extend, to either side, one of which 36 defines an elastic return spring for returning the control lever 22 towards its inactive position, in relation with a fixed stud 40, and the other 38 is capable of acting on a pin 42 secured to zero-reset hammers 44, in order to make the latter pivot in a clockwise direction of rotation in the view shown in the figure, as disclosed below.

It should be noted that the zero-reset hammers 44 are in this instance placed one on top of the other, being secured to each other, which is not visible in the front view, each of them being associated with one of the zero-reset cams 14, 16.

The travel of the second control lever 22 is set in such a way that its pawl 26 acts on the additional column-wheel in order to rotate it in the anti-clockwise direction of rotation by a little less than one full pitch. A jumper 46 is arranged on a frame element to cooperate with the toothing 28 of the additional column-wheel and complete the current pitch, after the end of the action of the pawl 26, and to keep the additional column-wheel in its stable inactive position, as shown in FIG. 1.

FIG. 1 also shows that the mechanism according to the invention advantageously comprises a lever 18, pivoted according to an axis of rotation 20, and carrying a beak 48 arranged to cooperate with the columns 32 of the additional column-wheel and allow the latter to control the angular orientation of the lever 18, between an inactive position in which it leaves the chronograph brake 104 free to move depending on the START or STOP state of the mechanism, and a zero-reset position in which it acts on the chronograph brake 104 to move it away from the counter 4, if necessary. The cooperation between the beak 48 and the additional column-wheel helps ensure that the brake 104 is set apart from the counter 4 during zero-resetting operations, whether the chronograph mechanism 1 is in the START mode (brake already set apart from the counter) or the STOP mode (brake in contact with the counter).

An elastic return member 112 is provided to act on the lever 18, to tend to make it pivot in the anti-clockwise direction of rotation in the view shown in the figures, i.e., so that it moves towards the additional column-wheel. The elastic return member 112 is made here as one with an additional lever 106 which is designed to play a role when the minute counter 2 is reset to zero. Indeed, an appropriate rotation of the levers 18 and 106 leads, in particular, to the lifting of an actuating beak engaged with the minute counter 2, during zero-reset operations, this actuating beak being otherwise responsible for driving the minute counter 2 as a function of the movements of the second counter 4 during time measuring operations.

Moreover, the operating mode of the lever 18 can be used to act on the kinematic link connecting the chronograph counter 4 to a drive wheel of the timepiece movement, during zero-resetting operations. Indeed, generally, the coupling comprises a transmission member carried by a coupling lever that is able to move between two positions, a coupled position and an uncoupled position, allowing such a kinematic link to be established or broken depending on the START or STOP operating mode of the chronograph mechanism. However, it is necessary to break this kinematic link, in the START mode, in order to be able, in particular, to reset the seconds counter 4 to zero. The lever 18 may therefore also be arranged to move the transmission member away from the chronograph counter 4 when the chronograph brake 104 is set apart from the counter 4 in order to reset the latter to zero. To this end, the transmission member 114 could, in particular, be connected in a novel way to the coupling lever 116 via an elastically deformable connection member 118, which would thus be deformed under the effect of the action of the lever 18. Thanks to this construction, the transmission member 114 can be moved away from the disc 12 of the second counter 4, by way of a deformation of the connection member 118, even when the chronograph mechanism is in its START functioning mode. Hence, a change in the orientation of the coupling lever 116 is not necessary during zero-resetting operations.

Figure 2A:
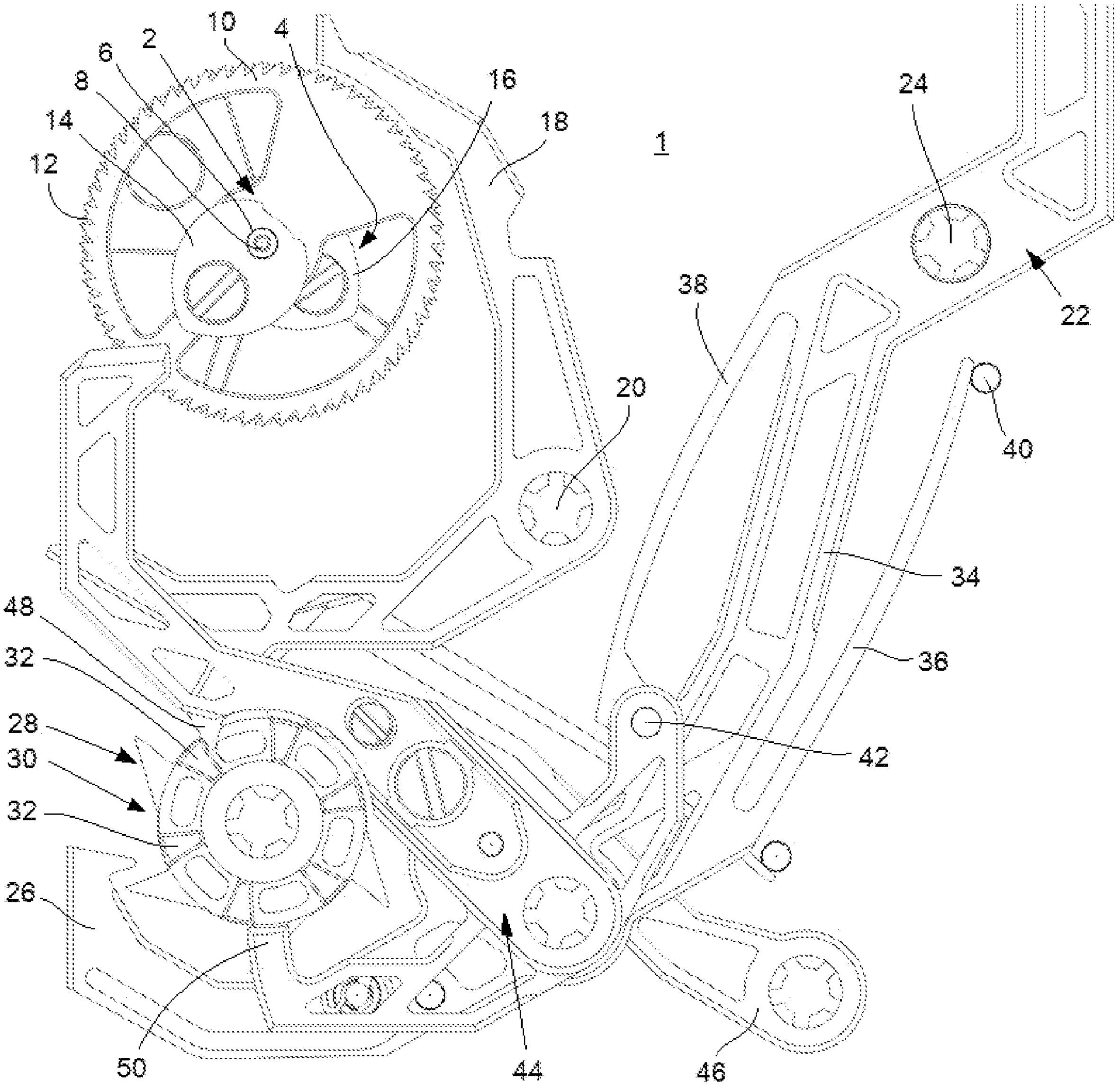
FIGS. 2*a* to 2*f* show a same detailed front view of the actuating mechanism shown in the FIG. 1, in six successive operating phases.
Figure 2B:
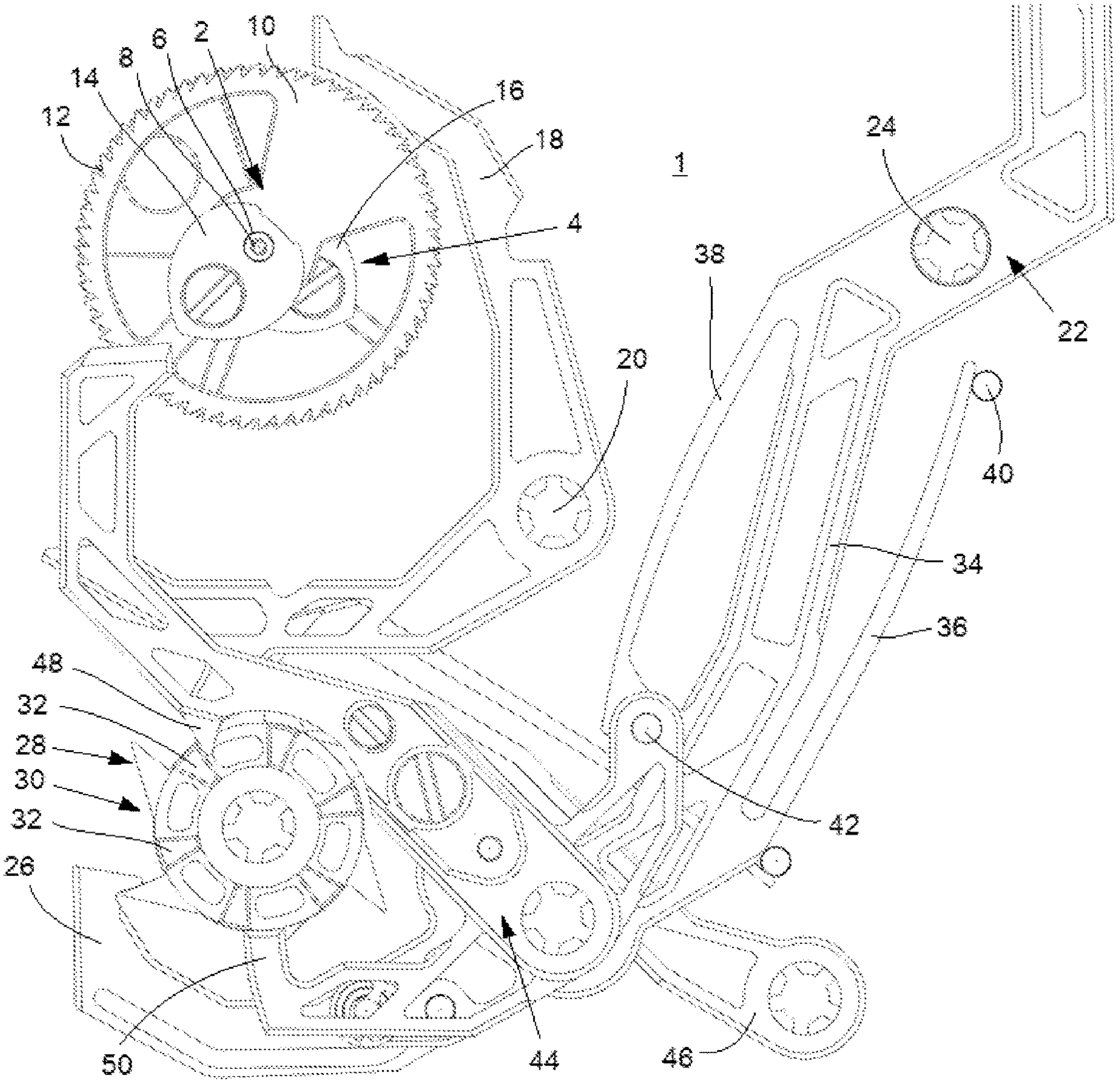
Figure 2C:
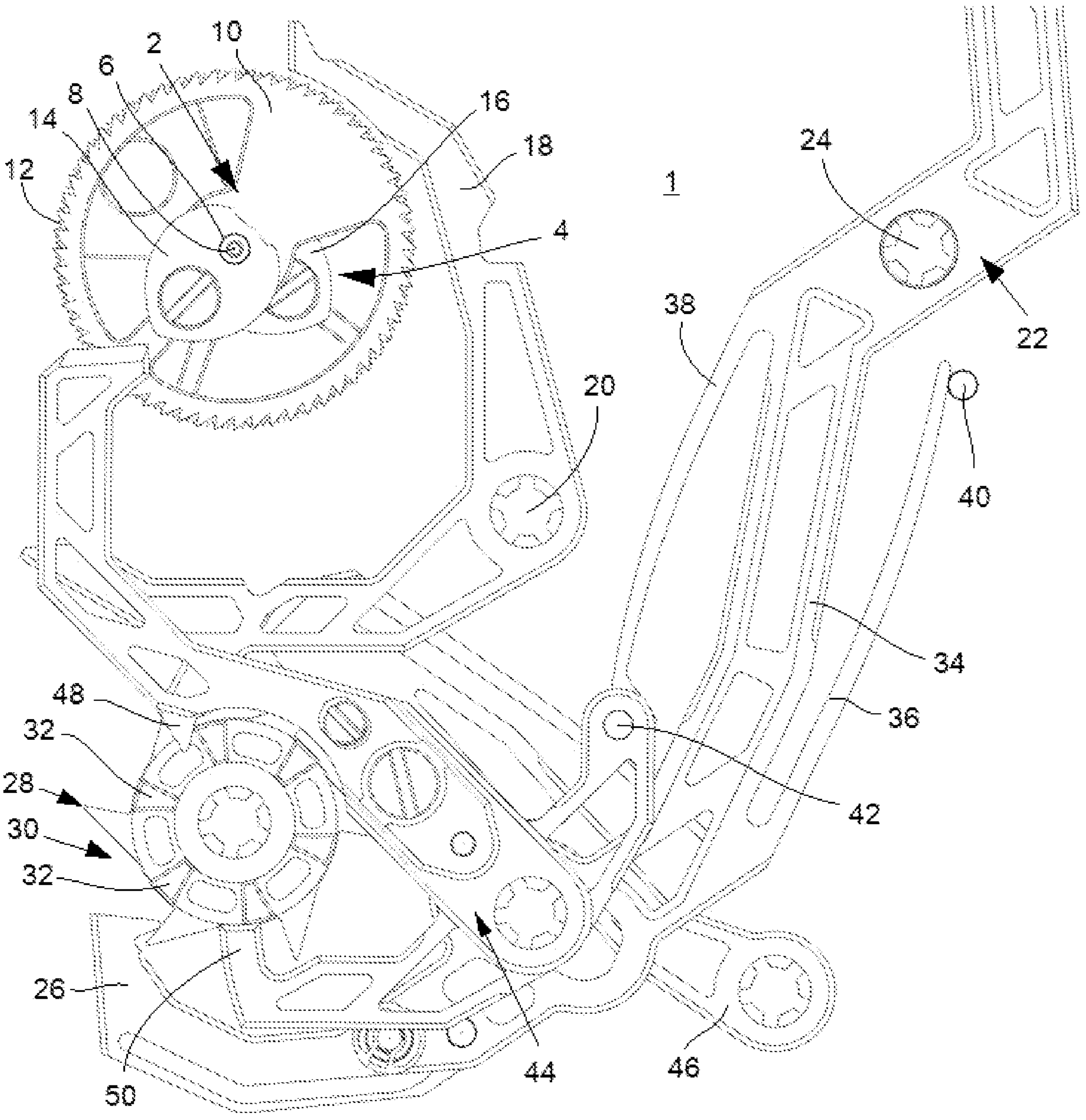
Figure 2D:
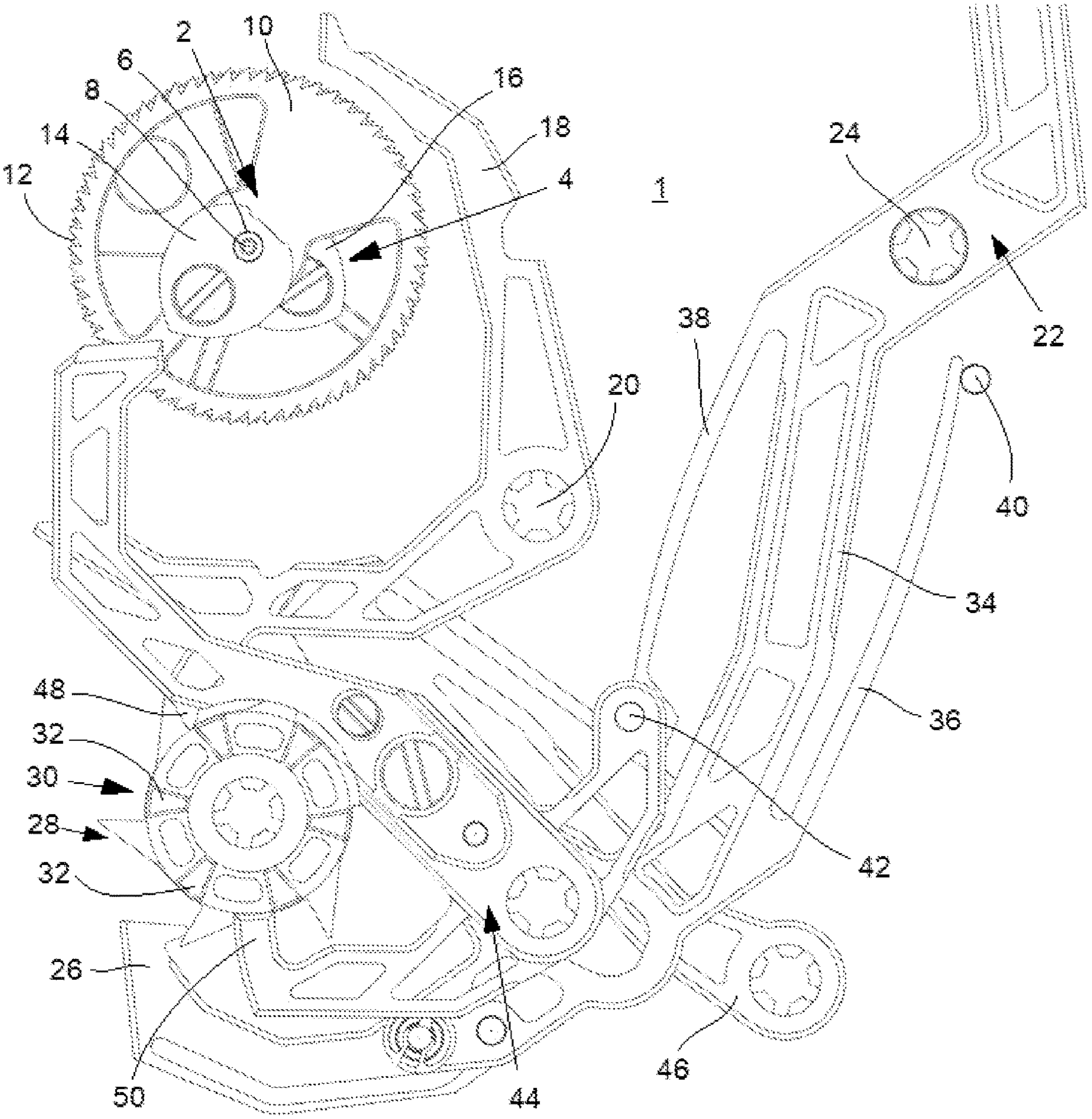
Figure 2E:
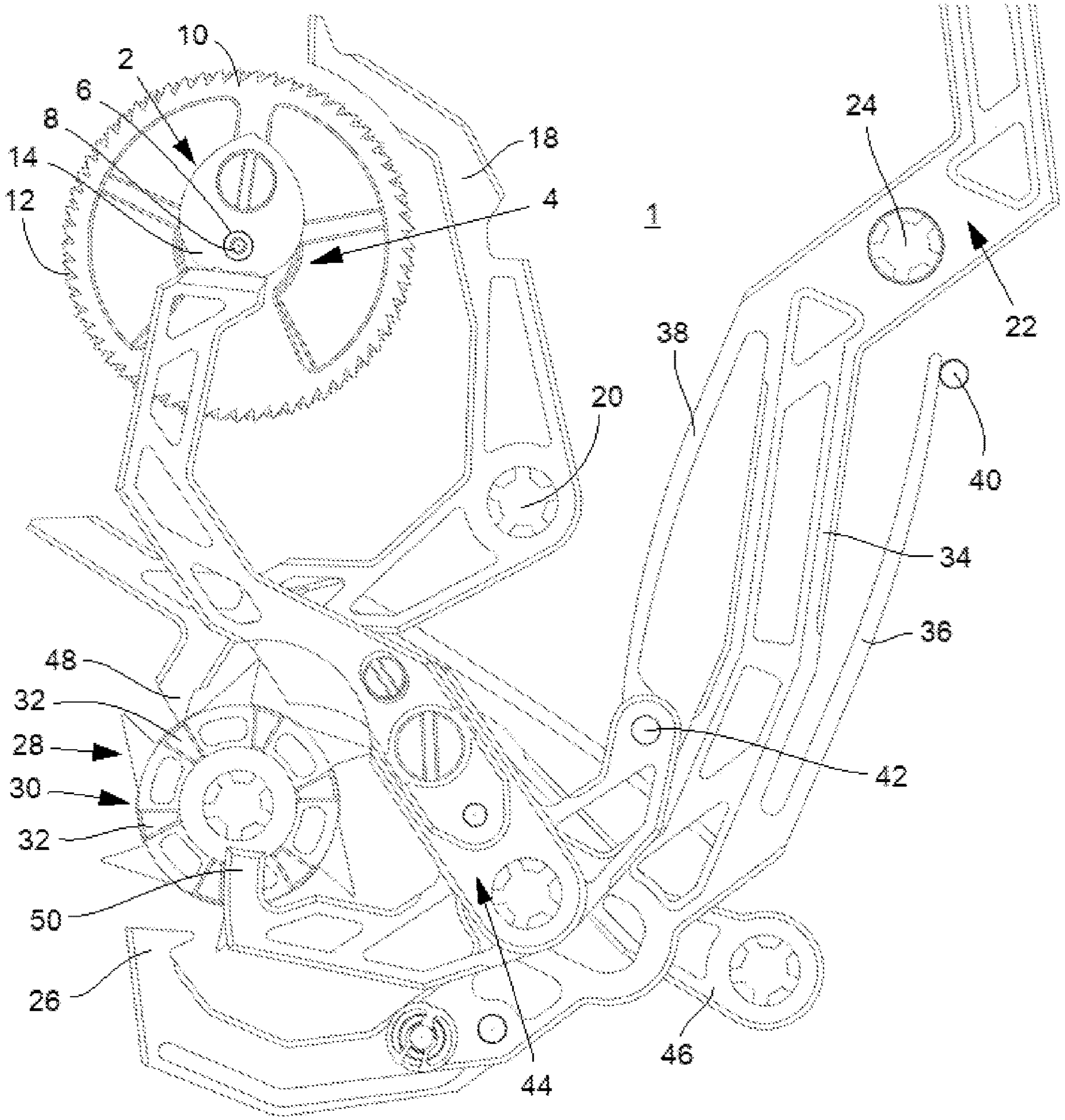

It can also be seen in FIG. 1 that the zero-reset hammers 44 are secured to a beak 50 arranged to cooperate with the columns 32 of the additional column-wheel and control the angular orientation of the zero-reset hammers 44, between their neutral or inactive position, as shown in FIG. 1, and their active position (as shown in FIG. 2*e*).

The operation of the zero-reset mechanism will now be set out in detail in relation with FIGS. 2*a* to 2*f*, which show different successive steps thereof.

FIG. 2*a* shows the configuration of the actuating mechanism according to the invention when the chronograph mechanism 1 is in either of its functioning modes, START or STOP.

In this situation, the zero-reset control lever 22 is not in contact with the additional column-wheel, the angular orientation of which is kept fixed by its jumper 46.

Generally, the lever 18 is arranged so as to allow an uncoupling or isolation of the chronograph counters. It always cooperates with the additional lever 106 which is prestressed under the effect of the action of the elastic return member 112. When the lever 18 is actuated, it cooperates with the additional lever 106 to isolate the minutes counter 2 and allow the zero-resetting of the latter, as far as it is then only undergoing the action of its jumper 108.

In the case where the chronograph mechanism is in its START functioning mode, the column-wheel 110 moves the brake 104 away from the seconds counter 4 and the lever 18 thus does not cooperate with the brake 104 when it is actuated. However, in this case, the lever 18 acts on the transmission member 114 to move it away from the seconds counter 4. In the case where the chronograph mechanism is in its STOP functioning mode, the column-wheel 110 acts on the coupling 102 so as to move the transmission member 114 away from the seconds counter 4. In this case, when the lever 18 is actuated, it does not cooperate with the transmission member 114 but it however cooperates with the brake 104 to move it away from the seconds counter 4.

Referring back to FIG. 2*a*, it appears that the beak 48 of the lever 18 is situated in a recess between two columns 32 of the additional column-wheel.

The beak 50 of the zero-reset hammers 44 is kept outside of the external perimeter defined by the columns 32 of the additional column-wheel by the control lever 22, thus keeping the zero-reset hammers at a distance from the zero-reset cams 14, 16.

When a user begins to apply pressure to the zero-reset control lever 22 (via the push button, which is not shown), the latter begins to pivot in the anti-clockwise direction of rotation in the view shown in the figures, as shown in FIG. 2*b*.

When the control lever 22 pivots, the pawl 26 comes into contact with the toothing 28 of the additional column-wheel. At the same time, the elastic portions 36 and 38 of the control lever 22 start to tension and to store mechanical energy, the elastic portion 36 bearing against the fixed stud 40, and the elastic portion 38 bearing against the pin 42 secured to the zero-reset hammers 44, the latter being kept fixed in their inactive position as a consequence of the abutment of the beak 50 against a column 32 of the additional column-wheel.

After the control lever 22 has completed a certain amount of travel, the additional column-wheel also begins to rotate, as shown in FIG. 2*c*.

At this point, the column 32 against which the beak 50 of the zero-reset hammers 44 is still bearing has simply moved while keeping the zero-reset hammers 44 locked in their inactive position, while another column 32 has moved towards the beak 48 of the lever 18.

When the control lever 22 pivots further, as shown in FIG. 2*d*, the lever 18 is lifted under the effect of the action of the column 32 that has moved towards its beak 48.

The beak 50 of the zero-reset hammers 44 is still bearing against the same column 32 but is about to be positioned facing a recess between this column and the next. Meanwhile, the elastic portions 36 and 38 of the control lever 22 have substantially accumulated a maximum amount of mechanical energy by being deformed, the control lever 22 being virtually at the end of its travel.

A slight additional pivoting of the control lever 22 releases the beak 50 of the zero-reset hammers 44, as shown in FIG. 2*e*, because the column 32 that was locking them has been completely moved away from the beak 50. At the same time, the pawl 26 has been released from the toothing 28 of the additional column-wheel.

The elastic portion 38 loaded to its maximum can then release its mechanical energy, pivoting the zero-reset hammers 44 in the clockwise direction of rotation in the view shown in FIG. 2*e*, until they abut against the zero-reset cams 14, 16, which in turn rotate to a predefined angular orientation, associated with the display members displaying the seconds and minutes of timed time being positioned at 0, in a conventional manner.

At the same time, the column 32 that acts on the lever 18 has moved opposite the beak 48, while continuing to act on it.

In this configuration, it can be seen that the additional column-wheel is in an unstable orientation, its jumper 46 being under tension, bearing on a single tooth of the toothing 28. At the same time, no additional rotation of the additional column-wheel is possible in the anti-clockwise direction of rotation in the view shown in FIG. 2*e*, due to the positioning of the zero-reset hammers 44, the beak 50 of which defines an abutment for the next column 32.

As long as the user keeps applying pressure to the control lever 22, the actuating mechanism remains in the state shown in FIG. 2*e*, time measurement being suspended with the display members displaying the measured times positioned at 0.

Figure 2F:
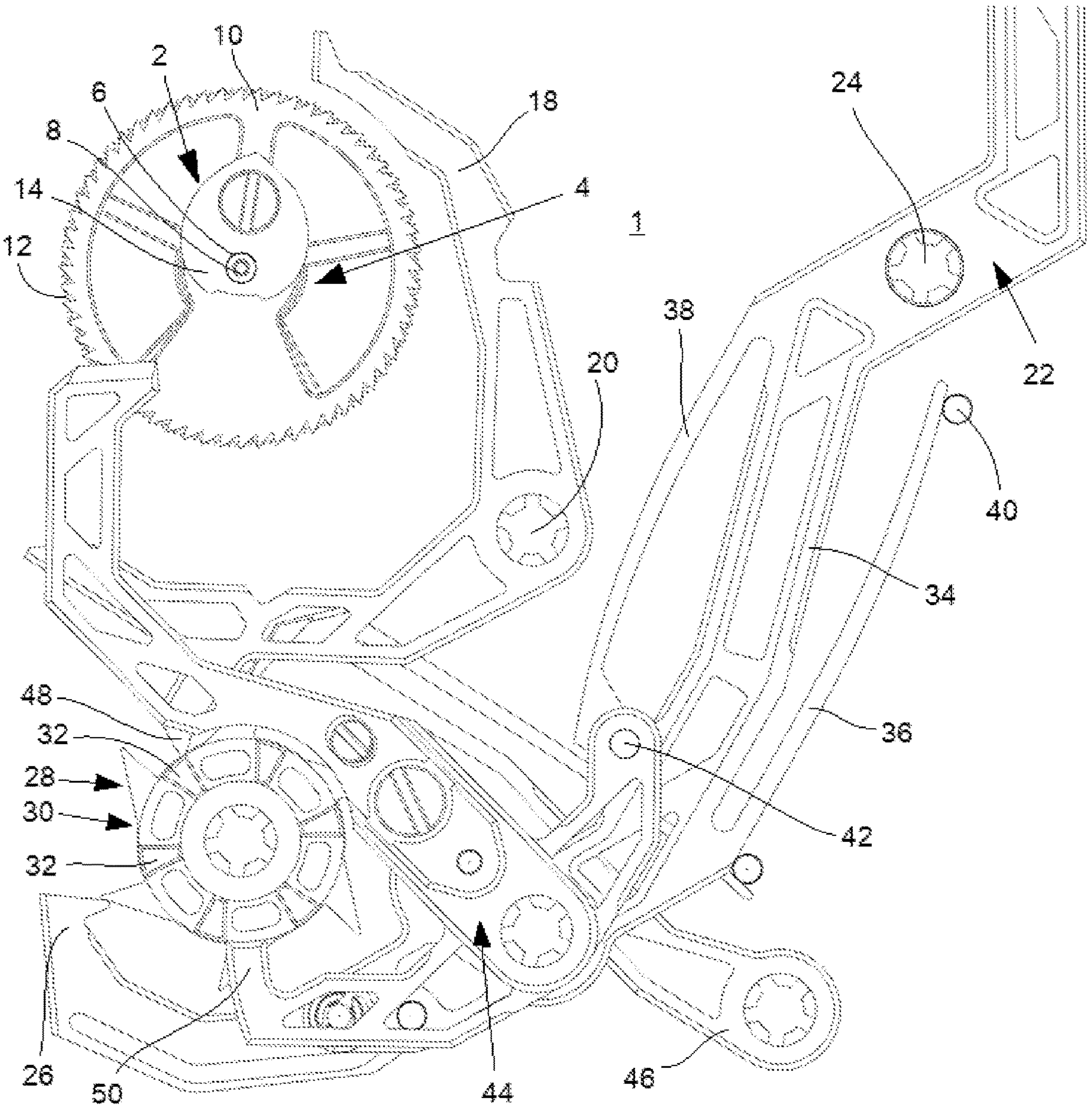

When the user releases the control lever 22, it is returned to its inactive position, as shown in FIG. 2*f*, under the effect of the action of its elastic portion 36 on the stud 40.

By rotating in the clockwise direction of rotation, the control lever 22 comes into contact with the pin 42 of the zero-reset hammers 44 with its rigid central portion 34, at the same time allowing the elastic portion 38 to release its tension. The elastic portion 36 has elastic properties such that its action on the control lever 22, intended to rotate it in the clockwise direction of rotation in the view shown in FIG. 2*f*, also lifts the zero-reset hammers 44 in order to return them to their inactive position.

When it rotates further in the clockwise direction in the configuration shown in FIG. 2*f*, the control lever 22 acts on the zero-reset hammers 44 to such an extent that their beak 50 is released from the recess between two columns 32 in which it was situated, and thus releases the additional column-wheel which can complete the pitch started under the effect of the action of the pawl 26, and assume a new stable position, as shown in FIG. 2*a*, under the effect of the driving action of its jumper 46.

By rotating further, the additional column-wheel also releases the beak 48 of the lever 18, which falls back into a recess between two columns 32. Hence, the chronograph mechanism switches back to its configuration as dictated by the orientation of the column-wheel 110, meaning that the brake 104 falls back against the disc 12 of the seconds counter 4 if the chronograph mechanism is in its STOP functioning mode, or meaning that the transmission member 114 falls back against the disc 12 if the chronograph mechanism is in its START functioning mode.

Moreover, the pawl 26 of the control lever 22 retracts in order to switch from the configuration shown in FIG. 2*f* to that of FIG. 2*a*.

Thus, when the user releases the control lever 22, the actuating mechanism according to the invention switches back from the configuration shown in FIG. 2*f* to that shown in FIG. 2*a*, and time measurements restarts from 0 if the zero-resetting operation was a flyback zero-resetting operation, in other words, if the chronograph mechanism was in its START functioning mode. Otherwise, if the chronograph mechanism was in its STOP functioning mode, all the chronograph counters remain in their zero position.

It should be noted that, if the user releases the control lever 22 before the zero-reset hammers 44 have fallen against the zero-reset cams 14, 16, the tension in the two elastic portions 36, 38 of the control lever 22 can be released and the additional column-wheel returns to its stable inactive position under the effect of the action of its jumper 46, by rotating in the clockwise direction of rotation.

FIGS. 3*a* to 3*h* show pairs of front views of a first side and of the opposing side respectively of an actuating mechanism according to an alternative embodiment of the present invention, in four successive operating phases.

More specifically, this actuating mechanism is similar to that which has been disclosed in relation with FIGS. 2*a* to 2*f*, its components being modified only to a minor extent in reference to the description above. Therefore, the same numerical references are used in FIGS. 3*a* to 3*h* to identify the components described above, in order to facilitate the understanding thereof.

Figure 3A:
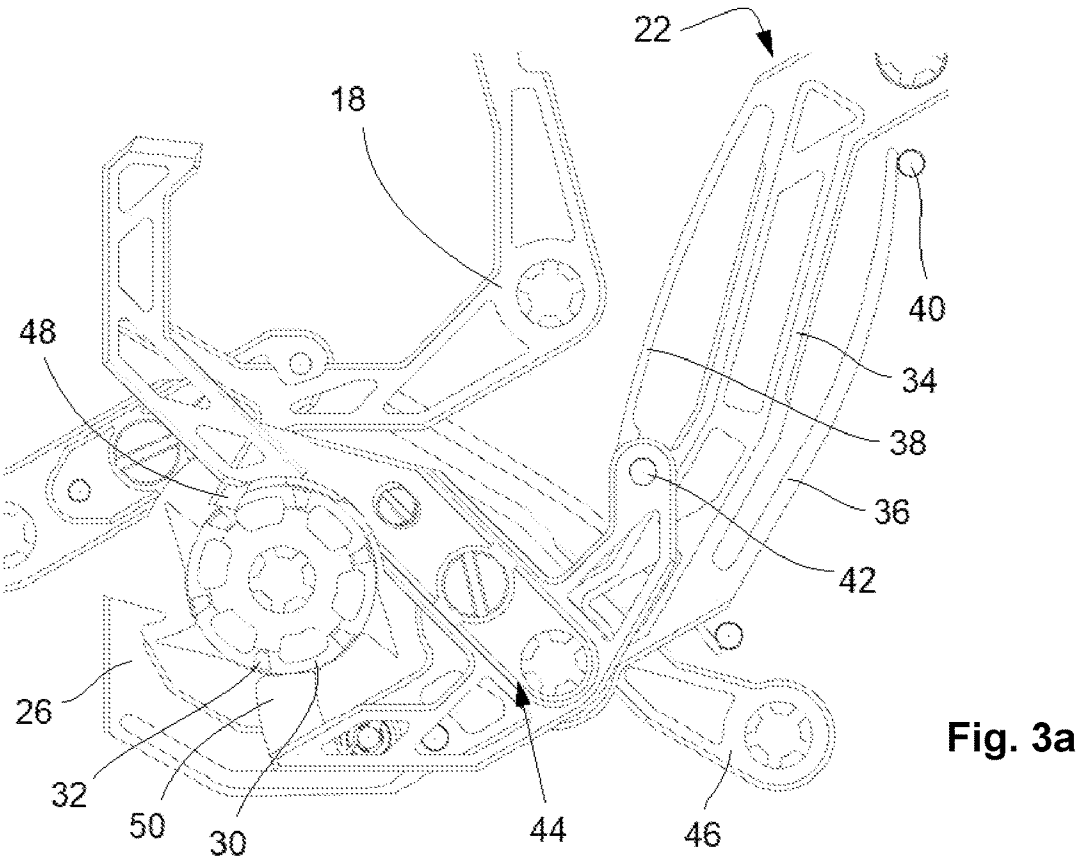
FIGS. 3*a* to 3*h* show pairs of front views of a first side and of the opposing side respectively of an actuating mechanism according to an alternative embodiment of the present invention, in four successive operating phases.
Figure 3B:
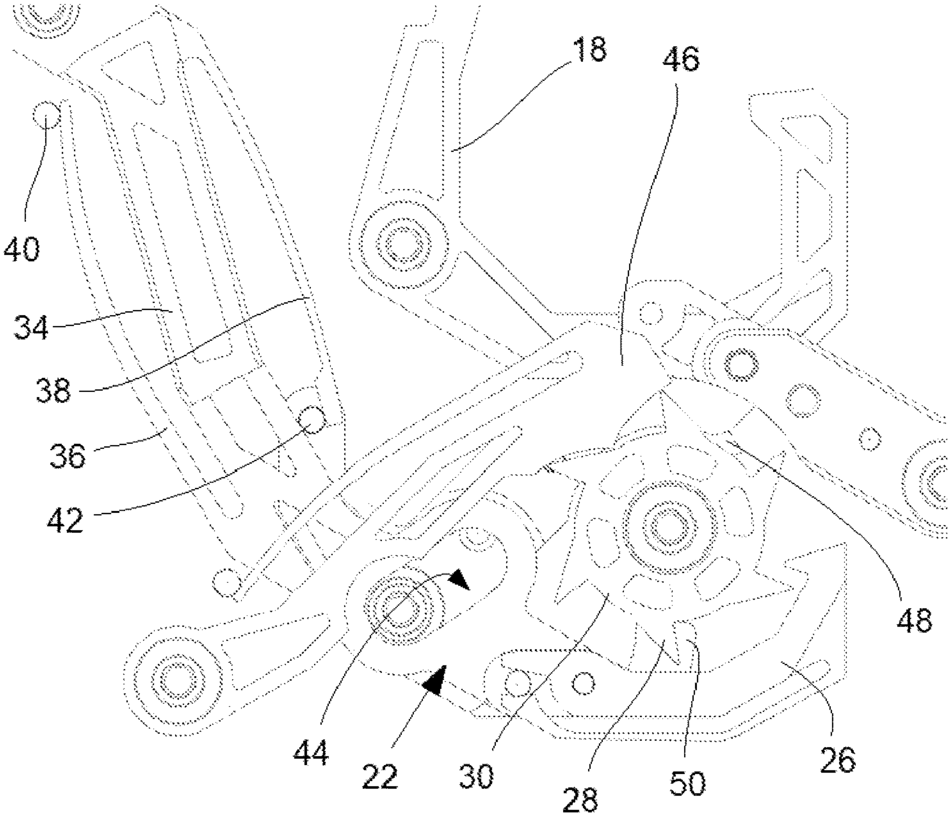

FIGS. 3*a* and 3*b* show the configuration of the actuating mechanism when the chronograph mechanism 1 is in either of its functioning modes, START or STOP.

In this situation, the zero-reset control lever 22 is not in contact with the additional column-wheel, the angular orientation of which is kept fixed by its jumper 46.

The beak 48 of the lever 18 is situated in a recess between two columns 32 of the additional column-wheel.

The beak 50 of the zero-reset hammers 44 is kept outside of the external perimeter defined by the columns 32 of the additional column-wheel by the control lever 22, thus keeping the zero-reset hammers at a distance from the zero-reset cams 14, 16.

Figure 3C:
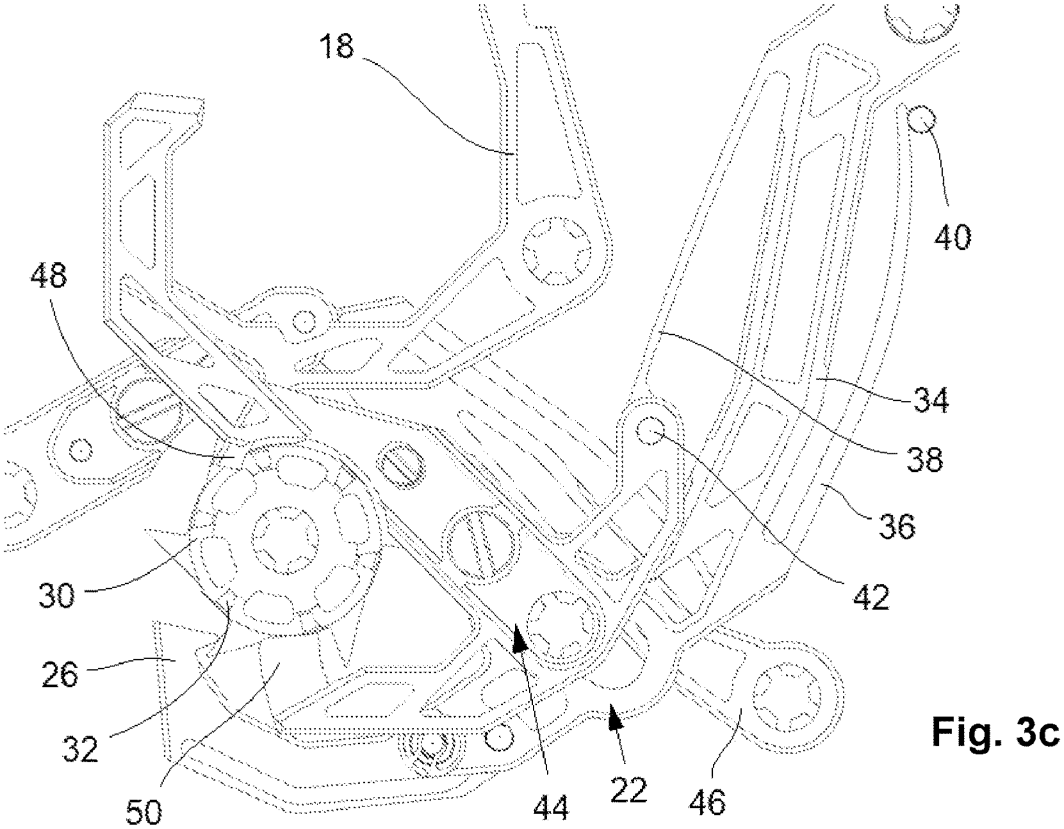
Figure 3D:
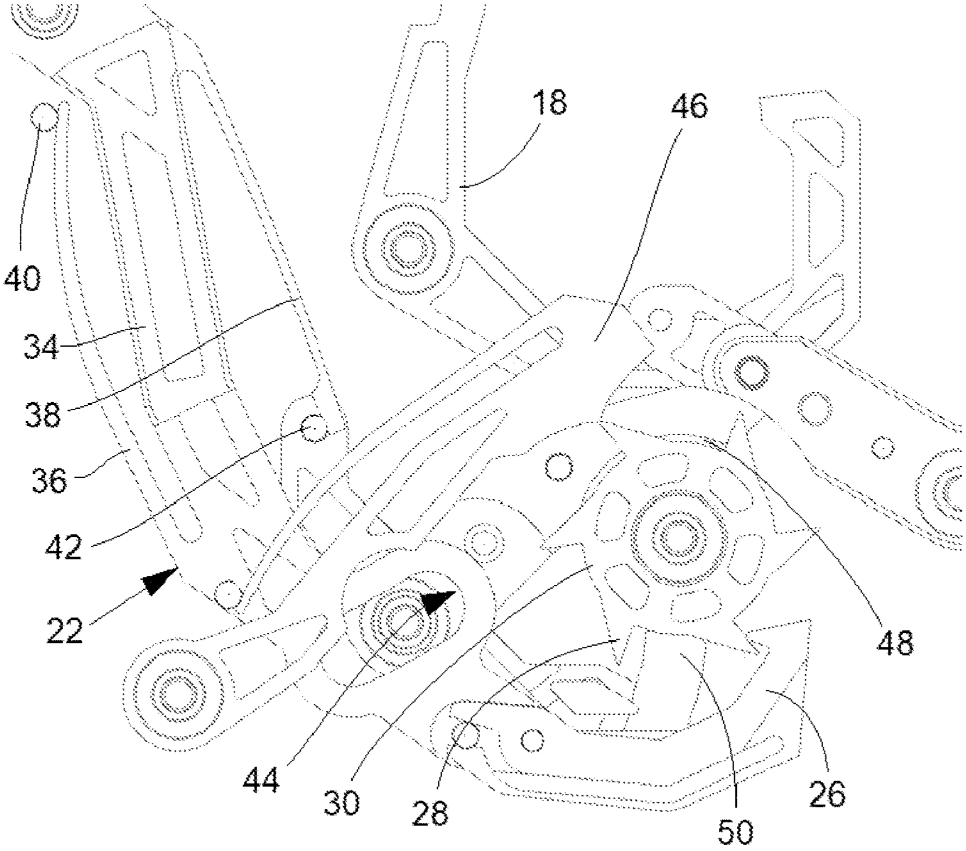

When a user begins to apply pressure to the zero-reset control lever 22, the latter begins to pivot in the anti-clockwise direction of rotation in the view shown in FIG. 3*a*, as shown in FIGS. 3*c* and 3*d*.

When the control lever 22 pivots, the pawl 26 comes into contact with the toothing 28 of the additional column-wheel. At the same time, the elastic portions 36 and 38 of the control lever 22 start to tension and to store mechanical energy, the elastic portion 36 bearing against the fixed stud 40, and the elastic portion 38 bearing against the pin 42 secured to the zero-reset hammers 44, the latter being kept fixed in their inactive position as a consequence of the abutment of the beak 50 against a column 32 of the additional column-wheel.

By pivoting, the control lever 22 rotates the additional column-wheel on itself, which can be seen in particular in FIG. 3*c*, which shows the movement performed by the column 32 on which the beak 50 of the zero-reset hammers 44 rests from the inactive configuration shown in FIG. 3*a*.

At the same time, a new column 32 of the additional column-wheel is positioned behind the beak 48 of the lever 18.

It can be seen more particularly in the view shown in FIG. 3*d* that a tooth of the toothing 28 of the additional column-wheel has pushed the jumper 46 back to a maximum load position of the latter, the configuration shown representing an instant preceding the tipping point, beyond which the jumper 46 will once more be able to move towards the additional column-wheel, releasing the mechanical energy stored during the initial phase.

Figure 3E:
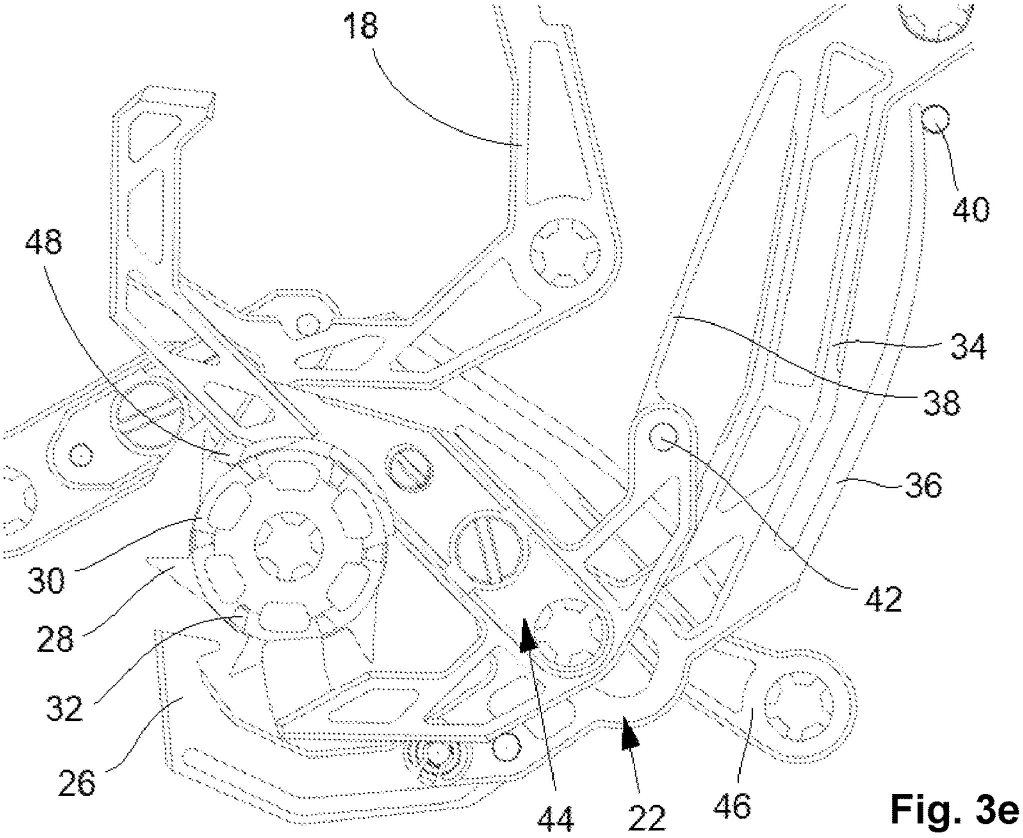
Figure 3F:
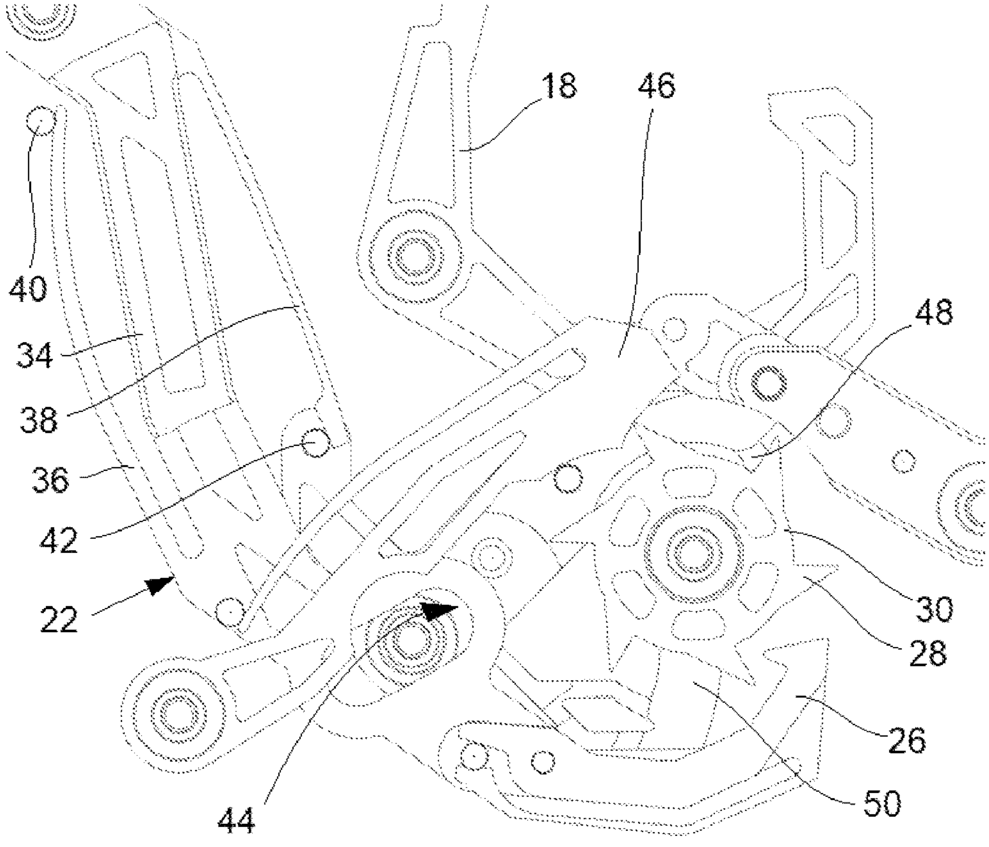

It is therefore understood that, from the configuration shown in FIGS. 3*c* and 3*d*, any additional rotation of the additional column-wheel will allow the jumper 46 to apply a driving force to its toothing 28, as shown in FIGS. 3*e* and 3*f*.

Indeed, these figures show a configuration in which the control lever 22 has continued to rotate slightly, passing the tipping point, and the additional column-wheel has then been driven by the driving action of the jumper 46 to such an extent that it is out of reach of the pawl 26 of the control lever 22.

It can be seen in the view shown in FIG. 3*e* that the force applied by the jumper 46 to the toothing 28 makes it possible to lift the beak 48 of the lever 18, while the zero-reset hammers 44 are still kept in the raised or neutral position by their beak 50 resting on a column 32.

Figure 3G:
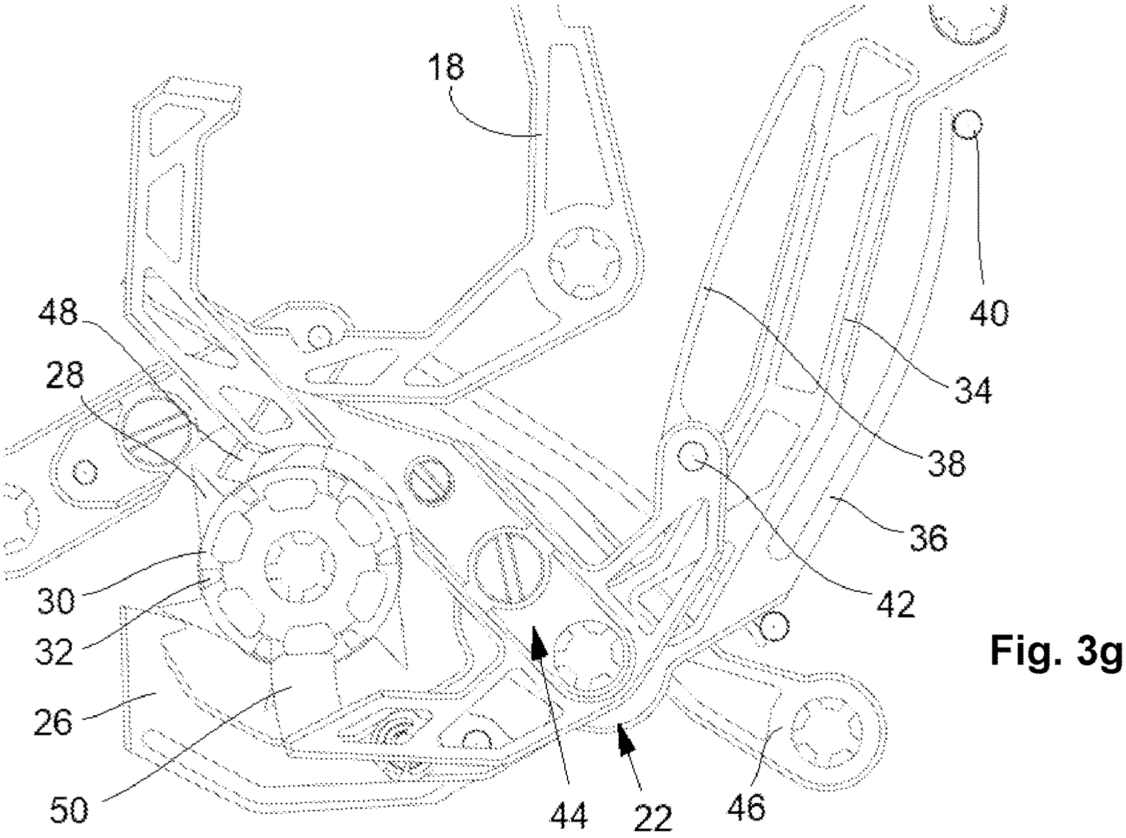
Figure 3H:
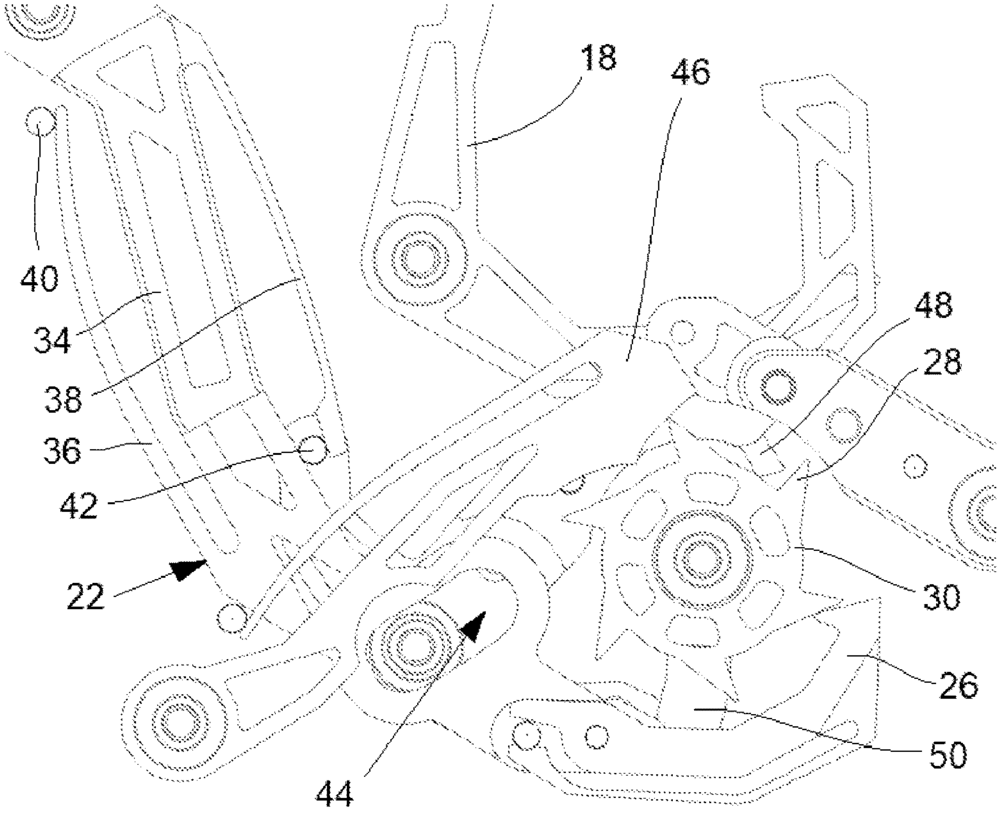

It can be seen in the view shown in FIG. 3*f* that, in this configuration, the jumper 46 still acts on the toothing 28 to continue to rotate the additional column-wheel until it reaches the orientation shown in FIGS. 3*g* and 3*h*.

The last rotational movement of the additional column-wheel, under the effect of the driving action of its jumper 46, has allowed the lever 18 to be positioned in such a way as to isolate all the chronograph counters, by lifting either the brake 104 or the transmission member 114 depending on the START or STOP functioning mode of the chronograph mechanism, and has allowed the beak 50 of the zero-reset hammers 44 to fall between two columns 32, under the effect of the energy accumulated by the elastic portion 38 of the control lever 22 being released.

In this configuration, the jumper 46 has not yet released all the stored energy, but the additional column-wheel cannot rotate any further because the beak 50 is located on the path of one of its columns 32.

When the control lever 22 is released, it can pivot towards its inactive position, in the clockwise direction of rotation in the view shown in FIG. 3*g*, under the effect of the energy stored by its elastic portion 36 being released, and act on the zero-reset hammers 44 in order to bring them towards their raised position, as already described in relation with the first embodiment. In doing so, the beak 50 is removed from its lowered position and releases the additional column-wheel, which can then return to its first state under the effect of the residual driving action of its jumper 46, as shown in FIG. 3*h*.

The actuating mechanism then returns to its initial configuration, as shown in FIGS. 3*a* and 3*b*.

Therefore, unlike the operation of the embodiment described in relation with FIGS. 2*a* to 2*f*, the driving force now allowing the lever 18 to be raised is no longer that provided directly by the user via the control lever 22, but originates from the jumper 46 (previously loaded by the user via the control lever 22). This means that, in the case of the first embodiment, the user acts simultaneously on four springs, namely the two elastic portions 36, 38 of the control lever 22, the jumper 46 and the elastic return member 112 of the lever 18 whereas, in the context of the second embodiment, shown in FIGS. 3*a* to 3*h*, the user only acts on three springs, some of the energy provided to the jumper 46 being used indirectly, at a later time, to neutralize the action of the elastic return member 112 of the lever 18.

Moreover, it should also be noted that the edges of the beak 50 are slightly rounded in the context of the second embodiment shown in FIGS. 3*a* to 3*h*. Indeed, advantageously, the corresponding rounded edges and the slope of the beak 48 of the lever 18 are designed so as to follow the lever 18, and by way of consequence the brake 104 or the transmission member 114, when the user releases the zero-resetting push button, to give them a "dragging" and no longer instantaneous quality, as in the case of the first embodiment in FIGS. 2*a* to 2*f*. The risk of the seconds hand of the chronograph jumping when restarting it after a flyback zero-reset can therefore be reduced or indeed eliminated.

As a result of the features that have just been disclosed, an "all or nothing" actuating mechanism is obtained that has a flexible structure and offers precise and reliable operation. As already indicated above, the sensation felt by the user when actuating this mechanism is comfortable because the different springs involved (the two elastic portions 36, 38 and the jumper 46, and indeed the elastic return member 112) can be produced in such a way as to present substantially linear resistance over the entire travel of the control lever 22. Moreover, the user very clearly feels the instant when the zero-reset hammers 44 are released, also ensuring excellent feedback.

As indicated above, although the "all or nothing" actuating mechanism according to the preferred embodiment of the invention, as shown and described, comprises a control lever acting on a column-wheel and on zero-reset hammers of a chronograph mechanism, other embodiments may be considered without departing from the context of the invention as defined by the set of claims, and a person skilled in the art may design the control lever such that it acts on a control member of a different nature to a column-wheel and on an actuating lever other than one or more zero-reset hammers. As a non-limiting example, the actuating mechanism according to the invention may be integrated into a striking mechanism of a timepiece movement, the control lever then being arranged to load a striking mechanism spring and to activate the striking mechanism in response to pressure applied by a user allowing the control lever to move up to the end of its travel.

Generally, the implementation of the present invention is not limited to the precise geometry of the different components of the mechanism as shown and described. Indeed, a person skilled in the art will encounter no particular difficulty in adapting the present teaching to the implementation of an actuating mechanism that has the features of the present invention, in which the components may have different shapes and layouts to those which are described and shown. Therefore, for example, a single chronograph counter or two non-axial chronograph counters could be provided, the elastic portions 36, 38 could be replaced with springs separate from the control lever 22. One could also provide that the transmission member 114 and the brake 104 be driven by the fall down of the hammers, as in a conventional chronograph mechanism, but this would require an increased angular travel of the hammers to be implemented to make it possible for the mechanism to be uncoupled before the zero-reset cams are actuated.

What is claimed is:

1. An actuating mechanism for a timepiece movement comprising an actuating lever for actuating a clock function intended to be mounted so as to be able to move on a frame element of the timepiece movement, between an inactive position and an active position, a control lever intended to be moved in response to pressure applied by a user, between an initial position and an actuated position, so as to be able to move said actuating lever from the inactive position to the active position, an elastic return member arranged to return said control lever to the initial position in response to said control lever being released by the user, a control member capable of pivoting between a first inactive state, in which the control member locks said actuating lever in the inactive position, and a second state, in which the control member releases said actuating lever to allow said actuating lever to move to the active position, said control lever being arranged to act on said control member, in response to pressure applied by the user, and move said control member from the first state to the second state, wherein said control lever has an elastically deformable portion, arranged to act on said actuating lever and move said actuating lever towards the active position in response to the pressure applied by the user, and a rigid portion arranged to act on said actuating lever and move said actuating lever towards the inactive position in response to said control lever being released, and wherein said actuating mechanism comprises a jumper arranged to return said control member to the first state in response to said control lever being released.

2. The mechanism of claim 1, wherein said rigid portion of said control lever carries a retractable pawl intended to cooperate with said control member.

3. The mechanism of claim 2, wherein said control member is a column-wheel comprising a disc carrying N teeth intended to cooperate with said control lever to switch from said first state to said second state, and with said jumper to switch from said second state to said first state, and N columns intended to cooperate with said actuating lever.

4. The mechanism of claim 1, wherein said control member is a column-wheel comprising a disc carrying N teeth intended to cooperate with said control lever to switch from said first state to said second state, and with said jumper to switch from said second state to said first state, and N columns intended to cooperate with said actuating lever.

5. A timepiece movement comprising an actuating mechanism according to claim 4.

6. A timepiece comprising a timepiece movement according to claim 5.

7. A chronograph mechanism with a flyback function, for a timepiece movement, comprising at least one chronograph counter, a transmission member capable of having a first, coupled, position, in which a kinematic link between a drive wheel of the timepiece movement and said chronograph counter is functional, and a second, uncoupled, position, in which the kinematic link is broken, a brake that is able to move between a first position, in which the brake locks said chronograph counter, and at least one second position, in which the brake leaves said chronograph counter free to rotate, a control unit that can be actuated by a user to alternately occupy a first state, corresponding to time measurement, and a second state, corresponding to the chronograph mechanism being stopped, said control unit being arranged to cooperate with said transmission member and with said brake to define their respective positions, a zero-reset device, wherein the chronograph mechanism comprises an actuating mechanism according to claim 1 in which said actuating lever performs the function of a zero-reset hammer of said zero-reset device, in relation with said chronograph counter, said actuating lever being set apart from said chronograph counter in the actuating lever's inactive position, and cooperating with said chronograph counter in the actuating lever's active position, in order to place said chronograph counter in a predefined configuration, and wherein said control member is capable of acting on said transmission member and on said brake, to shift them to their second position, in response to the pressure applied to said control lever by the user.

8. The chronograph mechanism of claim 7, wherein said rigid portion of said control lever carries a retractable pawl intended to cooperate with said control member.

9. The chronograph mechanism of claim 8, wherein said control member is a column-wheel comprising a disc carrying N teeth intended to cooperate with said control lever to switch from said first state to said second state, and with said jumper to switch from said second state to said first state, and N columns intended to cooperate with said actuating lever.

10. The chronograph mechanism of claim 7, wherein said control member is a column-wheel comprising a disc carrying N teeth intended to cooperate with said control lever to switch from said first state to said second state, and with said jumper to switch from said second state to said first state, and N columns intended to cooperate with said actuating lever.

11. The chronograph mechanism of claim 10, further comprising a lever arranged to cooperate with said control member so as to occupy first and second orientations associated respectively with said first and second states of said control member, wherein said lever is also arranged to be able to switch said transmission member from said transmission member's first position to said transmission member's second position, and to be able to switch said brake from the brake's first position to the brake's second position, by switching the lever from the lever's first to the lever's second orientation.

12. The chronograph mechanism of claim 11, further comprising a coupling lever carrying said transmission member and comprising an elastically deformable portion capable of being stressed to switch said transmission member to the transmission member's second position in response to pressure applied to said control lever by the user.

13. The chronograph mechanism of claim 11, further comprising a minute counter coaxial with said chronograph counter and an additional zero-reset hammer that is able to move between an inactive position, set apart from said minute counter, and a zero-reset position in which the hammer cooperates with said minute counter in order to place said minute counter in a predefined configuration, wherein said additional zero-reset hammer is secured to said actuating lever and has the same axis of rotation as said actuating lever.

14. A timepiece movement comprising a chronograph mechanism according to claim 11.

15. The chronograph mechanism of claim 10, further comprising a coupling lever carrying said transmission member and comprising an elastically deformable portion capable of being stressed to switch said transmission member to the transmission member's second position in response to pressure applied to said control lever by the user.

16. The chronograph mechanism of claim 10, further comprising a minute counter coaxial with said chronograph counter and an additional zero-reset hammer that is able to move between an inactive position, set apart from said minute counter, and a zero-reset position in which the hammer cooperates with said minute counter in order to place said minute counter in a predefined configuration, wherein said additional zero-reset hammer is secured to said actuating lever and has the same axis of rotation as said actuating lever.

17. A timepiece movement comprising a chronograph mechanism according to claim 10.

18. The chronograph mechanism of claim 7, further comprising a lever arranged to cooperate with said control member so as to occupy first and second orientations associated respectively with said first and second states of said control member, wherein said lever is also arranged to be able to switch said transmission member from said transmission member's first position to said transmission member's second position, and to be able to switch said brake from the first position to the second position, by switching the lever from the first to the second orientation.

19. The chronograph mechanism of claim 18, further comprising a coupling lever carrying said transmission member and comprising an elastically deformable portion capable of being stressed to switch said transmission member to the transmission member's second position in response to pressure applied to said control lever by the user.

20. The chronograph mechanism of claim 18, further comprising a minute counter coaxial with said chronograph counter and an additional zero-reset hammer that is able to move between an inactive position, set apart from said minute counter, and a zero-reset position in which the hammer cooperates with said minute counter in order to place said minute counter in a predefined configuration, wherein said additional zero-reset hammer is secured to said actuating lever and has the same axis of rotation as said actuating lever.

21. A timepiece movement comprising a chronograph mechanism according to claim 18.

22. The chronograph mechanism of claim 7, further comprising a coupling lever carrying said transmission member and comprising an elastically deformable portion capable of being stressed to switch said transmission member to the transmission member's second position in response to pressure applied to said control lever by the user.

23. A timepiece movement comprising a chronograph mechanism according to claim 22.

24. The chronograph mechanism of claim 7, further comprising a minute counter coaxial with said chronograph counter and an additional zero-reset hammer that is able to move between an inactive position, set apart from said minute counter, and a zero-reset position in which the zero-reset hammer cooperates with said minute counter in order to place the minute counter in a predefined configuration, wherein said additional zero-reset hammer is secured to said actuating lever and has the same axis of rotation as said actuating lever.

25. A timepiece movement comprising a chronograph mechanism according to claim 24.

26. A timepiece comprising a timepiece movement according to claim 25.

27. A timepiece movement comprising a chronograph mechanism according to claim 7.

28. A timepiece comprising a timepiece movement according to claim 27.

29. A timepiece movement comprising an actuating mechanism according to claim 1.

30. A timepiece comprising a timepiece movement according to claim 29.

* * * * *